United States Patent
Lohf

(10) Patent No.: US 8,163,245 B2
(45) Date of Patent: Apr. 24, 2012

(54) MICROFLUIDICS SYSTEM FOR MIXING AT LEAST TWO STARTING MATERIALS

(75) Inventor: Astrid Lohf, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 113 days.

(21) Appl. No.: 12/665,637

(22) PCT Filed: Jun. 17, 2008

(86) PCT No.: PCT/EP2008/057616
§ 371 (c)(1),
(2), (4) Date: Jan. 8, 2010

(87) PCT Pub. No.: WO2008/155327
PCT Pub. Date: Dec. 24, 2008

(65) Prior Publication Data
US 2010/0183482 A1    Jul. 22, 2010

(30) Foreign Application Priority Data
Jun. 19, 2007 (DE) .......................... 10 2007 028 116

(51) Int. Cl.
*B01J 19/00* (2006.01)
(52) U.S. Cl. ......... 422/130; 422/600; 422/601; 422/603
(58) Field of Classification Search .................. 422/130, 422/600, 601, 603
See application file for complete search history.

(56) References Cited

U.S. PATENT DOCUMENTS

| | | | | |
|---|---|---|---|---|
| 3,409,175 A * | 11/1968 | Byrne | ........................... | 222/640 |
| 3,601,986 A * | 8/1971 | Becker | ........................... | 60/456 |
| 4,818,706 A * | 4/1989 | Starr | ........................... | 436/180 |
| 4,859,422 A | 8/1989 | Qureshi et al. | | |
| 6,994,827 B2 * | 2/2006 | Safir et al. | ...................... | 422/130 |
| 7,175,874 B1 * | 2/2007 | Pacetti | ........................ | 427/2.25 |
| 7,256,044 B2 * | 8/2007 | Karlsson et al. | ................ | 436/37 |
| 7,410,615 B2 * | 8/2008 | Krug et al. | ..................... | 422/521 |
| 7,470,547 B2 * | 12/2008 | Tisone et al. | ................... | 436/180 |
| 2002/0159919 A1* | 10/2002 | Churchill et al. | ............. | 422/100 |
| 2003/0223909 A1* | 12/2003 | Oberbeck et al. | ............... | 422/99 |

(Continued)

FOREIGN PATENT DOCUMENTS

DE    103 41 110    10/2004

(Continued)

*Primary Examiner* — Walter D Griffin
*Assistant Examiner* — Huy-Tram Nguyen
(74) *Attorney, Agent, or Firm* — Cozen O'Connor

(57) ABSTRACT

A microfluidics system for mixing at least two starting materials having a prescribed number of parallel and identical mixing or reaction branches, in which a number of supply ducts corresponding to the number of starting materials open into a mixing or reaction channel. Each of the supply ducts includes an intake line for each starting material, an injection pump for each supply duct and a valve circuit between each intake line for a starting material, where the supply ducts for a respective starting material and a respective injection pump are provided to each respective supply duct. The valve circuit is configured to connect the injection pumps to the suction line in a first valve position, shut off the injection pumps in a second valve position, and to connect the injection pumps to the associated inlet channels in a third valve position. Each of the injection pumps, which are connected to each valve circuit, have a common drive. All mixing or reaction branches connected in parallel can thus be supplied with the same volumetric flow of starting material.

2 Claims, 2 Drawing Sheets

U.S. PATENT DOCUMENTS

| | | | |
|---|---|---|---|
| 2004/0052955 A1* | 3/2004 | Tisone | 427/421 |
| 2004/0109792 A1* | 6/2004 | Karlsson et al. | 422/99 |
| 2005/0052509 A1* | 3/2005 | Gilligan et al. | 347/85 |
| 2005/0056713 A1* | 3/2005 | Tisone et al. | 239/690 |
| 2005/0232387 A1 | 10/2005 | Padgett et al. | |
| 2006/0211132 A1* | 9/2006 | Miledi et al. | 436/180 |
| 2009/0042743 A1 | 2/2009 | DeLucas et al. | |
| 2009/0053814 A1 | 2/2009 | Patel et al. | |

FOREIGN PATENT DOCUMENTS

| | | |
|---|---|---|
| DE | 20 2005 007 485 | 7/2005 |
| EP | 0 299 658 | 1/1989 |
| EP | 1 510 255 | 3/2005 |
| WO | WO 2006/122191 | 11/2006 |
| WO | WO 2007/021812 | 2/2007 |

* cited by examiner

MICROFLUIDICS SYSTEM FOR MIXING AT LEAST TWO STARTING MATERIALS

CROSS-REFERENCE TO RELATED APPLICATIONS

This is a U.S. national stage of International Application No. PCT/EP2008/057616, filed on 17 Jun. 2008. Priority is claimed on German Application No. 10 2007 028 116.3, filed on 19 Jun. 2007.

BACKGROUND OF THE INVENTION

Microfluidics systems promise tremendous improvements in quality, rapidity and cost outlay, as compared with macroscopic systems, when chemical mixing and reaction processes are being performed, since the reaction and dwell times in the fluid paths of microfluidics systems are very short and only very small substance quantities are used and processed with high accuracy and in a reproducible way. Consequently, especially in industrial production, the quantity, throughput and productivity requirements can be satisfied, the fluid paths (mixing or reaction branches) have to be connected in parallel, where appropriate in large numbers (numbering-up).

Depending on the application, the parallel connection may be such that a plurality of identical microducts are each formed and connected in parallel in microfluidics components, for example a mixer or reactor, or such that entire microfluidics components or systems composed of microfluidics components are multiply connected in parallel. By means of suitable microengineering methods (for example, etching methods, LIGA technology or micromechanics), the parallel fluid paths can be produced identically with high precision, so that the same process conditions, such as pressure, temperature, mass throughflow, etc., should each prevail in all the parallel-connected fluid paths and therefore the same products can each be obtained from all the parallel mixing or reaction branches and be merged without losses of quality. This also presupposes, however, that all the parallel-connected mixing or reaction branches are supplied with the same volume flows of starting materials. Here, the problem arises in that microfluidics systems are inclined to operationally induce variations in the effective throughflow resistance due to blockages of the fluid paths. Thus, for example, reaction products may stick as solids to the duct walls (i.e., fouling), which increase the pressure drop across the reaction branch, and then become loose again. As a result, the pressure drop decreases abruptly. This behavior may occur cyclically and to a different extent or at different times for each reaction branch. Whereas in macroscopic systems, for example, the mass throughflow can readily be measured, virtually fault-free, and be delivered to a throughflow control, this is not possible at a justifiable outlay for the individual fluid paths in the case of parallelized microfluidics systems.

EP 1 510 255 A1 discloses a microfluidics system for mixing at least two starting materials having a single mixing or reaction branch, in which a number of supply ducts which corresponds to the number of starting materials issue into a mixing or reaction duct. Here, each of the supply ducts include an intake line for each starting material, an for each supply duct, a valve circuit between each intake line of a starting material, where the supply ducts for a respective starting material and a injection pumps are provide to each respective supply duct. Here, the injection pump consists of two individual injectors, one of which sucks material and the other of presses material. In addition, the valve circuit is designed for connecting the injection pumps, in a first valve position, to the intake line and connecting them, in a second valve position, to each assigned supply duct.

US 2005/0232387 A1 discloses a microfluidics system for mixing two starting materials, in which two injection pumps convey the starting materials through two supply ducts into a mixing or reaction duct. Furthermore, US 2005/0232387 A1 discloses a valve circuit for the continuous conveyance of the respective starting material and for filling the respective injection pump, consisting here of two individual injectors. Here, the valve circuit is designed, in a first valve position, to connect one of the two injectors to an intake line for the respective starting material, in a second valve position to shut off said injector and, in a third valve position, to connect it to the supply duct and to the other injector located on the latter.

EP 0 299 658 A2 discloses a system for mixing at least starting materials, in which two injection pumps driven synchronously by means of a common drive intake in the starting materials from reservoirs by valve arrangements and subsequently convey them through two supply ducts into a mixing unit.

DE 20 2005 007 485 U1 discloses an arrangement for metering fluids by means of injection pumps and valves, assigned to these, for changing over between fluid uptake and fluid discharge.

Here, a plurality of the injection pumps may be operated in parallel by a single drive.

DE 103 41 110 A1 discloses a mixing and metering section which is formed by microengineering on a chip and which is filled with the starting materials via valves by an injection pump.

SUMMARY OF THE INVENTION

It is an object of the present invention to supply all the parallel-connected mixing or reaction branches in a microfluidics system with the same volume flows of starting materials and at the same time to equalize the initial volume flow from one and the same starting material.

This and other objects and advantages are achieved in accordance with the invention by a microfluidics system for mixing at least two starting materials. In accordance with an embodiment of the invention, the microfluidics system includes a predetermined number of parallel and identical mixing or reaction branches that each include a number of supply ducts corresponding to the number of starting materials and which issue into a mixing or reaction duct.

Each of the supply ducts is provided with an intake line for each starting material, an injection pump for each supply duct, a valve circuit between each intake line of a starting material, where the supply ducts are provided for the respective starting material and the injection pumps for these supply ducts.

In accordance with an embodiment of the invention, the valve circuit is configured, in a first valve position, for connecting the injection pumps to the intake line, in a second valve position for shutting off said injection pumps and, in a third valve position, for connecting the injection pumps to each of the assigned supply ducts.

In the second valve position, the injection pumps, which are each connected to each valve circuit, are fluidically connected to one another. In addition, the injection pumps, which are connected to each valve circuit, have a common drive.

In accordance with an embodiment of the invention, an injection pump is provided in each case per starting material for each mixing or reaction branch, where these injection pumps are driven in common, in a known manner, for example, for double injection pumps. In the first valve position, the injection pumps are filled simultaneously with the respective starting material by the suction intake. In the second valve position, the sucked-in starting materials are brought to a predetermined pressure. Here, the individual injection pumps are connected fluidically to one another, so that the same pressure prevails in all the injection pumps. In the third valve position, the starting materials are distributed to the parallel mixing or reaction branches, where each injection pump supplies a reaction or mixing branch and are decoupled fluidically from the other injection pumps. All the injection pumps are driven in common. Consequently, the volume flows in all the parallel mixing or reaction branches are identical, even when these branches have different throughflow resistances.

In order to achieve a continuous supply of the mixing or reaction branches, in a way that is known per se, for each injection pump, a further injection pump operating complementarily to this may be provided, where the two injection pumps alternately suck in the starting material and supply the material to the reaction branch.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a further explanation of the invention, reference is made below to the figures of the drawing in which.

DETAILED DESCRIPTION OF THE PREFERRED EMBODIMENTS

Figure 1:
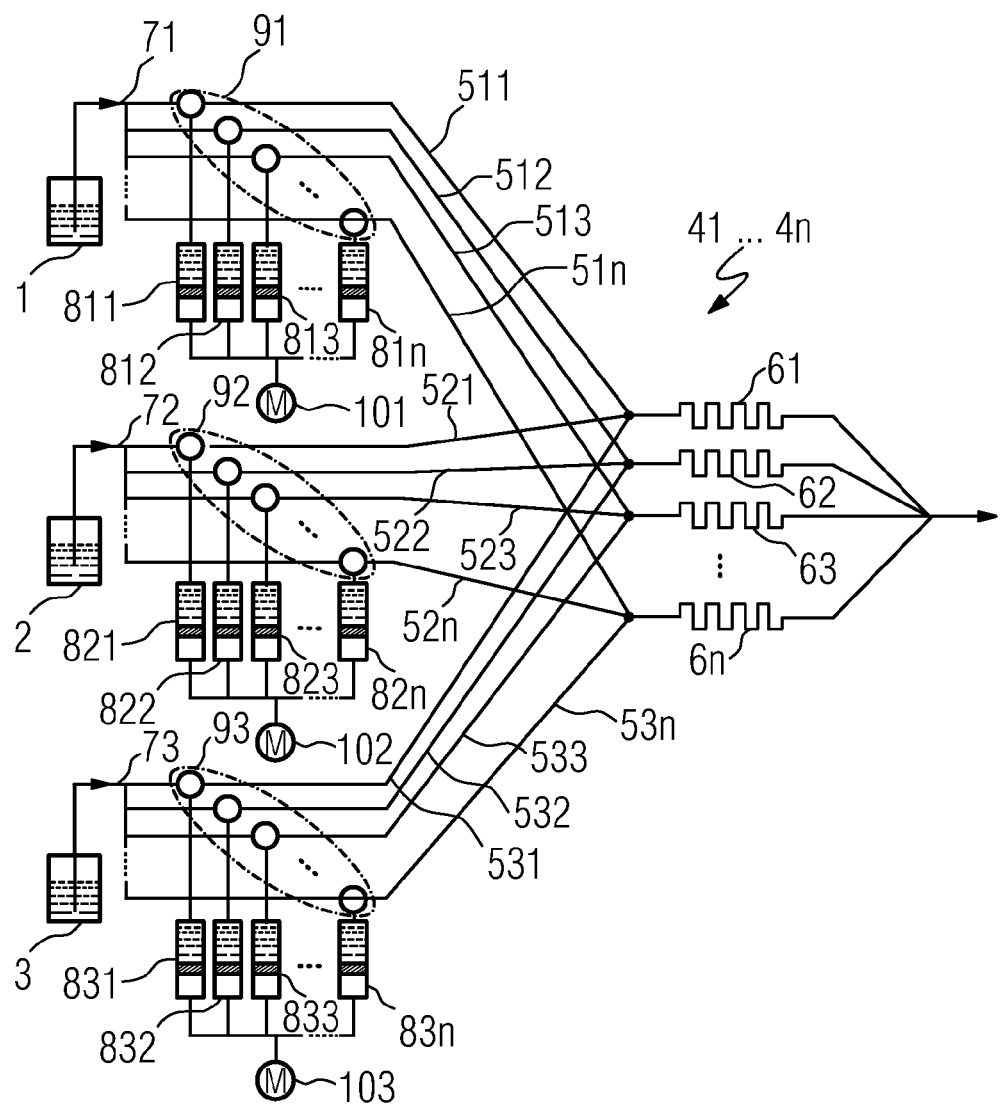
FIG. 1 shows a diagrammatic exemplary embodiment of the microfluidics system in accordance with the invention.

FIG. 1 shows a microfluidics system for mixing m=3 starting materials 1, 2 and 3 which are contained in reservoirs. The microfluidics system has n parallel and identical mixing or reaction branches 41 . . . 4n, in each of which a number of supply ducts 511 . . . 53n which corresponds to the number of starting materials 1, 2, 3 issue in each case into a mixing or reaction duct 61 . . . 6n. These starting materials 1, 2, 3 are sucked in from the reservoirs intake lines 71, 72, 73 and are subsequently distributed to the supply ducts 511 . . . 53n. For this purpose, an injection pump 811 . . . 83n is provided for each supply duct 511 . . . 53n, and a controllable valve circuit 91, 92, 93 is located between each intake line 71, 72, 73 of a starting material 1, 2, 3, where the supply ducts 511 . . . 53n are provided for the respective starting material 1, 2, 3 and the injection pumps 811 . . . 83n for these supply ducts 511 . . . 53n.

Each of the valve circuits 91, 92, 93 are configured, in a first valve position, for connecting the injection pumps 811 . . . 83n to the respective intake line 71, 72, 73 for sucking in the starting material 1, 2, 3 from the reservoir, in a second valve position for shutting off the injection pumps 811 . . . 83n, so that an operating pressure can be built up in the injection pumps 811 . . . 83n, and, in a third valve position, for connecting the injection pumps 811 . . . 83n to the supply ducts 511 . . . 53n assigned in each case, in order to press the starting material 1, 2, 3 into the respective supply ducts 511 . . . 53n. The injection pumps 811 . . . 83n which are respectively connected to each valve circuit 91, 92, 93 have a common drive 101, 102, 103 and are driven in parallel.

As indicated in FIG. 1, the valve circuits 91, 92, 93 may consist of individual valves or may be set up as multi-way valves.

Figure 2:
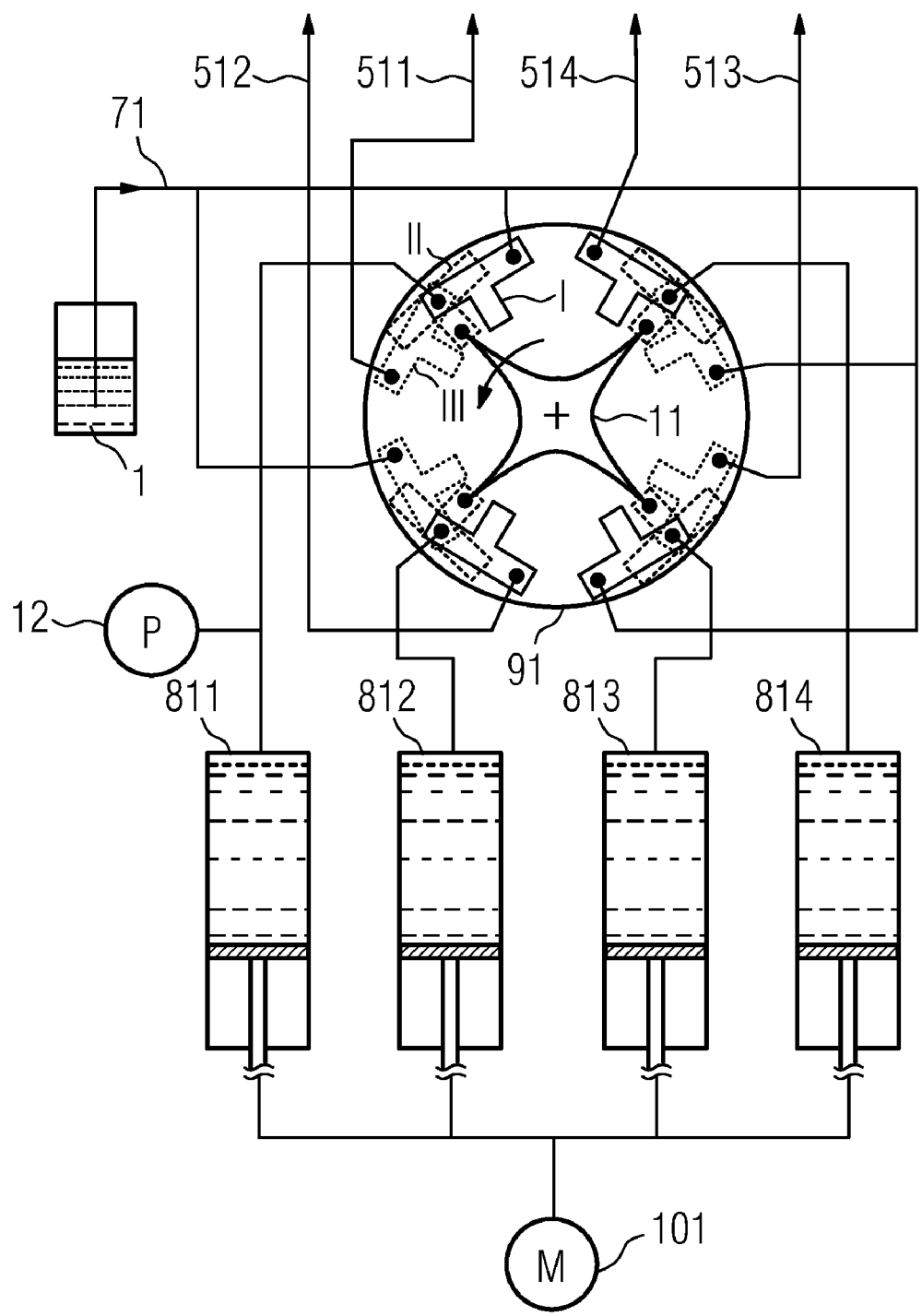
FIG. 2 shows a detailed exemplary illustration of the supply of different mixing or reaction branches with a starting material of the system of FIG. 1.

FIG. 2 shows an example of the valve circuit 91 in the form of a multi-way rotary valve, by which the, for example, n=4 injection pumps 811 . . . 814 are connectable to the intake line 71 for the starting material 1 in the first valve position I (illustrated by unbroken lines), and are connectable to the individual supply ducts 511 . . . 513 in the third valve position III (illustrated by dotted lines). In the second, middle valve position II, which is illustrated by dashed lines, the injection pumps 811 . . . 814 are shut off. As a result, the sucked-in starting material 1 can be brought to a predetermined pressure before it is introduced into the supply ducts 511 . . . 513. In this valve position, the individual injection pumps 811 . . . 814 are fluidically connected to one another (connection 11), so that the same pressure prevails in all the injection pumps 811 . . . 814 and can be measured by means of a single pressure sensor 12.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A microfluidics system for mixing at least two starting materials, comprising:
a predetermined number of parallel and identical mixing or reaction branches, each of the mixing or reaction branches having a plurality of supply ducts which correspond to the number of starting materials, said plural supply ducts issuing into a mixing or reaction duct;
respective intake lines for each of the starting materials;
respective injection pumps for each of the supply ducts;
respective valve circuits for each of the intake lines, each valve circuit arranged between a respective intake line, the plural supply ducts associated with the respective intake line, and the injection pumps associated with the respective intake line;
wherein said each valve circuit is configured, in a first valve position, to connect each respective injection pump associated with the respective intake line to the respective intake line, configured in a second valve position to shut off the each respective injection pump associated with the respective intake line, and configured in a third valve position to connect the injection pumps associated with the associated intake line to respective ones of the supply ducts associated with the respective intake line;

wherein, for each of the valve circuits, each of the injection pumps connected to a respective one of the valve circuits are fluidically connected to one another in the second valve position; and wherein, for each of the valve circuits, each of the injection pumps connected to the respective one of the valve circuits are connected to a common drive.

2. The microfluidics system as claimed in claim 1, further comprising an additional injection pump for each respective one of the injection pumps, the each additional fuel pump operating complementarily to the each respective one of the injection pumps.

* * * * *